United States Patent [19]

Chan

[11] Patent Number: 5,088,928
[45] Date of Patent: Feb. 18, 1992

[54] EDUCATIONAL/BOARD GAME APPARATUS

[76] Inventor: James K. Chan, 2342 Colt Rd., Rancho Palos Verdes, Calif. 90274

[21] Appl. No.: 494,972

[22] Filed: Mar. 16, 1990

Related U.S. Application Data

[63] Continuation-in-part of Ser. No. 273,704, Nov. 15, 1988, abandoned, which is a continuation of Ser. No. 97,094, Sep. 16, 1987, abandoned.

[51] Int. Cl.$^5$ .......................... A63B 67/00; G09B 7/00
[52] U.S. Cl. ...................................... 434/339; 273/237
[58] Field of Search .................. 434/334, 335, 339; 178/18; 273/237, 238

[56] References Cited

U.S. PATENT DOCUMENTS

| | | | |
|---|---|---|---|
| 4,521,199 | 6/1985 | Harte | 434/339 |
| 4,561,852 | 12/1985 | Harte | 434/339 |
| 4,570,149 | 2/1986 | Thornburg et al. | 178/18 |
| 4,587,378 | 5/1986 | Moore | 178/18 |
| 4,588,187 | 5/1986 | Dell | 273/1 E |
| 4,617,515 | 10/1986 | Taguchi et al. | 178/18 |

OTHER PUBLICATIONS

Wiswell, Phil, "Electronic Gaming" (Dungeons & Dragons), *Games*, Aug. 1981, p. 46.

*Primary Examiner*—Benjamin Layno
*Assistant Examiner*—Jessica J. Harris

[57] ABSTRACT

Method and apparatus for educational games comprising a plurality of printed cards/boards, and a novel low-cost touch pad with interface cable to the personal computer game-port. When an educational game is played, the player responds to computer questions/words/graphic object by pressing the corresponding answer in the printed card/board which is placed on top of the touch pad. This selection in terms of touched coordinates of the touch pad is sensed by the computer through the computer input/game port. Both computer generated sound and animation graphic pictures in terms of video games or others are used for either positive or negative feedback to the player. A variation of the same apparatus can be used for playing various computerized board games with a plurality of moving game pieces, and game boards by one or more players.

2 Claims, 7 Drawing Sheets

EDUCATIONAL/BOARD GAME APPARATUS

CROSS-REFERENCE TO RELATED APPLICATION

This is a continuation-in-part of U.S. patent application entitled "Education/Board Game Apparatus and Method" filed Nov. 15, 1988 and assigned Ser. No. 07/273,704, now abandoned, which was a continuation of Ser. No. 07/097,094filed Sept. 16, 1987, now abandoned.

TECHNICAL FIELD

The present invention relates to educational games, board games and computer video games. More particularly, the computerized board game of the invention, in its preferred embodiments, is designed to educate players and/or to provide entertainment of a video game using low-cost, but effective touch pad with identical joystick interface to a game-port.

BACKGROUND ART

Games can be classified as either educational games or entertainment games. There are many known types of educational games. One type is the standalone educational games comprising a printed matter placed on top of a hardwired sensing pad. The game is played either with two conductor wires in series with a battery and a lamp. The player connects the word and the object with the conductor wires through the holes in the printed sheet to the hardwired sensing pad. If the selection is correct, the hardwired sensing pad completes the electrical circuit and thus the lamp is lighted up signaling the correct selection. There ar other similar types of standalone educational games with a different varieties of methods for identification of the correct selection pairs. The main disadvantage of this technique is that the amount of feedback to the player is very much limited. The signaling is in terms of simple sound and/or light. Another disadvantage is that the position of the selection has to be precise, which is difficult for players of younger age group. Another type of educational games or games is the computer video games. They are software programs played in a personal computer. The input response by the player is in terms of the keyboard or the joystick. The computer video monitor displays the questions and the signalling of the correct selections. The main disadvantage of this class of educational games is that the use of keyboard entry is not suitable and/or convinient for the younger childen, and it is less fun to play the computer game with the keyboard control. The use of a joystick to play computer video game requires precise pointing or hand control, which is again not suitable for childen of younger age group.

Harte extends the convention standalone educational game concept to a computer-assisted teaching machine using a multilayer touch-sensing apparatus in U.S. Pat. No. 4,521,199 and in U.S. Pat. No. 4,561,852. In both disclosures, a instructional sheet A (in U.S. Pat. No. 4,521,199), 1 (in U.S. Pat. No. 4,561,852) that contains multiple questions, and a plurality of specific response holes 3 (in U.S. Pat. No. 4,521,199), 4 (in U.S. Pat. No. 4,661,852) adjacent to corresponding choices. The positions of these holes coincide with discrete sensing row and column conductors of the touch pad when placed on top of it. A computer then identifies the correctness or incorrectness of the touch response on one of the specific response holes, and this information is fed back to the student or retained for testing. However, Harte's apparatus also requires precise pointing to the specific set of holes, which again is not suitable for younger childen. Also, high pressure touching is required such as with a stylus G (in U.S. Pat. No. 4,521,199), 35 (in U.S. Pat. No. 4,561,852) so that multi-layer can be pressed together to create the electrical signals. Otherwise, some layers may not come to contact with each other and thus creating erroneous results. Another disadvantage is that the Harte's touch pad requires separate complex interface box such as switching relay boxes 5, 8 (in U.S. Pat. No. 4,521,199 and the resistive terminal boxes 10, 19 (in U.S. Pat. No. 4,561,852). The multi-layer and complex interface boxes make the apparatus expensive to manufacture.

The entertainment or fun games can be divided into video games similar to video educational games or board games. Boardgames in turn can be grouped into non-electronics or electronics board games. The non-electronics board game comprising a game board, a plurality of moving game pieces, a set of rolling dice or a spinner and other board game pieces. Almost all board games are for multiple players and for entertainment only. Each player rolls the dice or spin the spinner to determine the move position. Also, each board game has a fix set of game rules. They are standalone dedicated board games using no computer interface. The electronics board games are standalone portable electronic games which a player plays with the microprocessor-based electronics. This type of board games is examplified by electronic chess game board or "Dungeons and Dragons".

The recent patent disclosure, U.S. Pat. No. 4,587,878 by Moore describes a two-layer touch tablet construction. The device comprises a pair of insulating sheets, each sheet is coated with a resistive bar at one edge, and a series of interdigitataed conductive pathways 14, 15 extending toward and away from the bar. The sheets are arranged facing each other in an orthogonal orientation. Touch position is determined through a change in resistance measurement when proper contact such as contact points 2, 3 in FIG. 3 is made between the two sheets. In order to avoid non-proper contact points such as 4, 1 in FIG. 3, insulator dots such as 6 are coated between undesired conductor intersections. This requires a large amount of insulator dots, and precision manufacturing to align these structures. Moore's device is strictly intented for digitization and does not provide separate function buttons for game functions such as those provided in a commonly known joystick device.

DISCLOSURE OF INVENTION

This invention provides a low-cost apparatus with standard game-port interface to commonly known personal computer systems, and enables users, especially childen to play computerized programmable education games with finger pointing. The printer matter contains no boles. The touch area is large and thus does not require precision pointing. The touch pad is self-contained with no external interface electronics, and consists of only two layers. There are two additional non-position sensing touch switches for start, reset, clear and/or player A and B move identification. Thus, it is easy to use, reliable, and inexpensive to manufacture.

The present invention combines the advantages of both the conventional educational game and those of the computer video game without their inherent disadvantages of using a keyboard, a joystick or a precision pointing touch-sensing apparatus for input by small children. Briefly, a game apparatus according to this invention, includes: a set of printed cards/boards, a novel low-cost touch sensitive pad, an interface cable to the computer game-port, and a computer program corresponding to the said set of printed cards/boards. Thus, this programmable educational board game apparatus, according to this invention can be produced at a very low cost for the consumer market.

Another objective of this invention is to provide a low-cost general-purpose boardgame apparatus for one or more players with standard game-port interface to commonly known personal computer systems, and enables users, especially childen to play computerized programmable board games with a variaty of gameboards and moving-game pieces. Most of the game functions such as the rolling of dice or the spinning of spinner, move sensing and game rule checking, etc are handled by the computer, and this allows the player or players to concentrate on the game strategy. The computer in this regard also acts as a referee and a bookkeeper. The moving game pieces are used for players to indicate their present positions on the gameboard and also serve as downward-pressing vehicles for touch-signaling to the computer. Again, the touch pad is self-contained with no external interface electronics, and consists of only two layers. There are two additional non-position sensing touch switches for start, reset, clear and/or player A and B move identification. Thus, this board game apparatus is fun to use, reliable, versatile and inexpensive.

The low-cost touch pad construction in both said game devices eliminates the drawback of Moore by employing an innovative distributive ground return network such that touch sensing conductor is adjacent or in much closer proximity to the associated ground return conductor so that each touch-sensing position is composed of two touch switches. The magnitude of close proximity is determined by screen printing technology while the touch sensing resolution is determined by the footprint of the finger or the moving game piece. The typical distance between the sensing conductor and the corresponding ground return conductor is in the order of 1 mm while the distance between two sensing conductors, which determines the touch position resolution of the touch pad is in the oder of 3 to 5 mm. Also, dots/bumps which act as spacer to keep the two-layer separate, can be printed any where and do not require to be made of insulating material. The number of spacer dots required is much less than the number of touch positions. Thus, this touch apparatus does not require precision alignment and large number of dots.

As will become apparent, the computerized educational games and board games apparatus incorporating the invention are, relative to the educational/board games on the market, are much more versatile, but still inexpensive to manufacture due to the novel construction of the touch pad and its interface to the game-port of the personal computer system.

BRIEF DESCRIPTION OF THE DRAWINGS

For a better understanding of the invention, reference should be made to the accompany drawings wherein.

DETAILED DESCRIPTION

Figure 1:
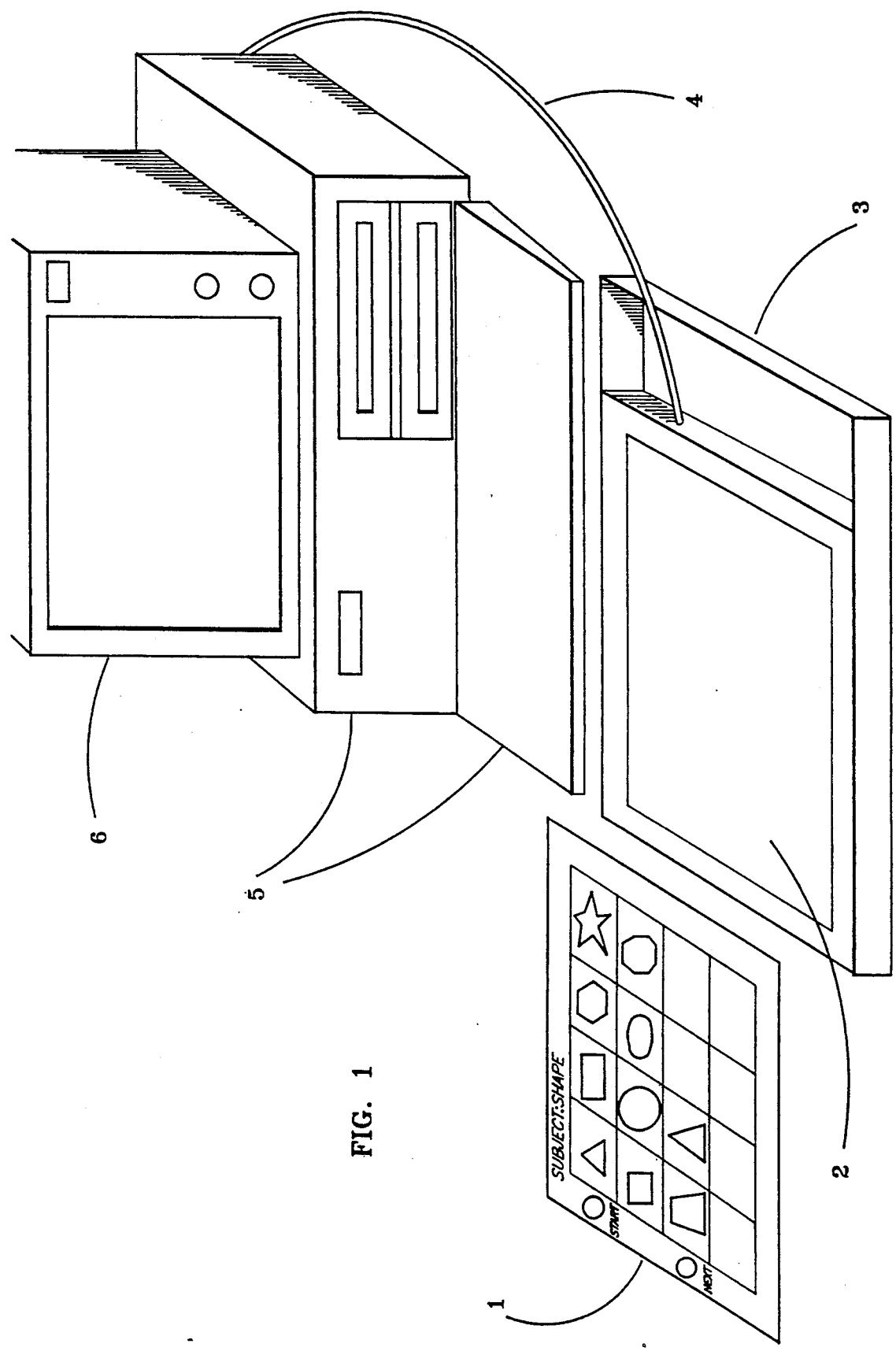
FIG. 1 shows the perspective view of the educational game apparatus according to the invention.

According to the invention, there is shown in FIG. 1 an educational game apparatus comprising a plurality of printer boards/cards 1, a low-cost touch pad 2 in a housing 3 with interface cable 4 to the game port or the input port of a computing system 5 with a video monitor 6, and a computer game program.

Figure 2:
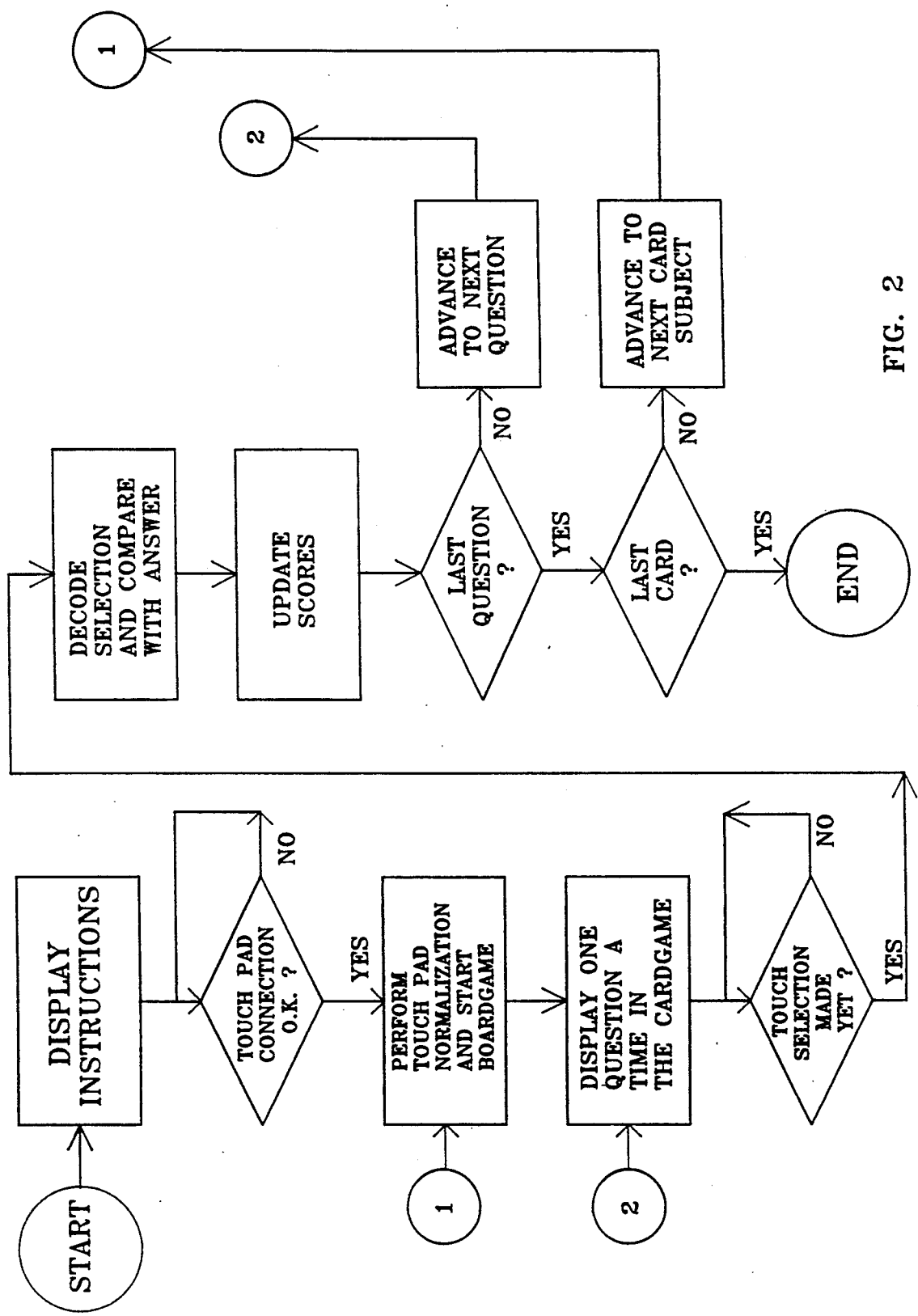
FIG. 2 shows the flow-chart of the educational game method according to the invention.

Each educational game program is dedicated to one subject matter or a combination of several subject matters. A player starts the game by running the computer game program on the computer system 5. First the video monitor 6 will display a menu for the selection of the desired subject such as alphabetics, words, number counting, time concept, arithematics, etc. After the player make a selection, the computer program will ask the player to select the skill level and place the first printed card 1 of the selected subject set on the touch pad 2. The program will wait until the start switch on the card is pressed signalling to the computer 5 that the player is ready. Then, the computer will display the question either in the form of a picture or text on the upper half of the monitor 6, and wait for the player to make a selection on the card 1 which contains either pictures, text or words. The player makes the selection by touching the desired object or text on the card 1. Its touched position is then sensed and decoded by the combination of the touch pad 2 underneath and the computer 5. The decoded cordinates are compared with the correct answer. A correct or wrong selection will be designated by a score or a miss respectively on a animated video game display on the lower portion of the video monitor 6 accompanying by different computer generated sound effects. Then the next question will be asked and so on until all questions are asked and the total score will be displayed to the player. The computer program will also alert the player to place the next card 1 on the touch pad 2 and press the the next button on the card/pad. The process repeats itself until the last card of the selected subject is done. It then returns to the menu display for another game or subject matter selection. FIG. 2 shows the flow chart of an educational game method according to the invention.

Figure 3:
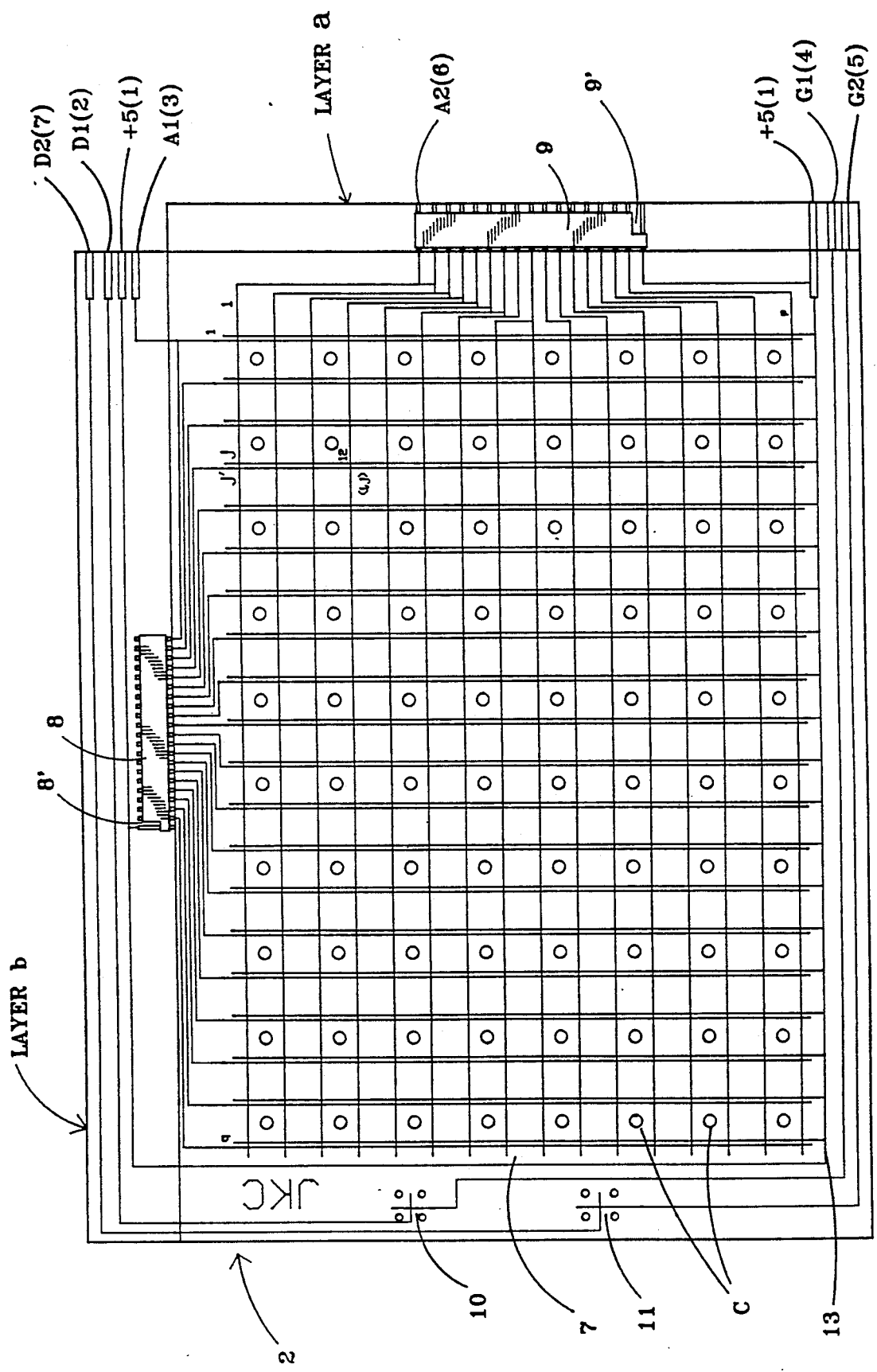
FIG. 3 shows the detailed construction of the touch pad device of the game apparatus according to the invention.

The detailed construction of the touch pad apparatus 2 is shown in FIG. 3. It includes a position touch sensitive region 7 comprising a matrix of (p×q) discrete touch positions, two terminal resistance Rx 8 and Ry 9, two discrete membrane switches 10, and 11 on one side of the touch sensitive region 7 and the game port interface connector conductor pads. The touch sensitive region relates to the method disclosed in co-pending U.S. patent application Ser. No. 06/939817, "Method and Devices for Touch Control", filed on Dec. 19, 1986, on an invention by James K. Chan. The matrix of discrete touch positions is composed of p rows of conductors in one layer (layer a in FIG. 3) electrically separated from two sets of q columns of conductors in another layer (layer b in FIG. 3). A touch position is formed wherever a row crosses a pair of column conductors as examplified by touch position (i,j) 12 in FIG. 3. The two sets of q columns of conductors are interleaved such that the first set is as close to the second set as possible as illustrated by conductors j in the first set and j' in in the second set. This resulted in the unequal spacing of the printed parrallel conductors. The proximity distance that can be achieved between the touch-sensing conductor j' and the ground-return conductor j is limited by silk screen printing technology and is typically about 1 mm. However, the spacing between two adjacent touch sensing conductors or conductors within each set is determined by the desired touch position resolution in the touch sensitive region. For purpose of touching by a finger in the present game apparatus, the typical spacing is in the order of 3 to 5 mm. One end of all the column conductors of the first set are connected to a common bus 13. The terminal resistance Ry 9 is electrically connected across one end of all the row conductors while the terminal resistance Rx 8 is across also one end of the second set of the column conductors as shown in FIG. 3. The terminal resistance can be implemented with E. I. Du PONT 4200 series polymeric resistive ink. One end of the terminal resistance Rx 8 and Ry 9 are electrically connected together and connected to the common bus 13. Thus the common bus 13 and the first set of the column conductors together serves as the common or ground return path for every touch position. The terminal resistance Rx 8 and Ry 9, and the two discrete switches 10, 11 are connected to the game port interface cable through the interface connector conductor pads. The specific game port interface standard designations for the IBM personnel computer are also labelled next to the relevant connector conductor pads in FIG. 3 for clarity.

As discussed earlier, a touch position at row i and column j denoted by (i,j), 12 in the touch sensitive area is therefore made up of the contacts between any one row i with any composite column comprising of two conductors j and j'. When one of these touch positions say (i,j), 12 is touched by a finger or a moving game piece, a row conductor will be pressed in electrical contact with the two conductors of the specific column. This in effect connects simultaneously the selected row conductor i and column conductor j to the ground or common path 13 through conductor j'. As the result, the terminal resistance value Rx 8 and Ry 9 are changed proportionally. If the resistance or resistor between any two column conductors is Ra and that between any two row conductors is Rb, then the terminal resistance Rx and Ry when the touched position (i,j) is being touched are given by $$Rx = (j-1) * Ra; \text{ for j from 1 to q} \quad (1)$$

$$Ry = (i-1) * Rb; \text{ for i from 1 to p} \quad (2)$$

Since for a given implementation Ra, Rb, p and q are known, the touch position (i, j) can be easily computed from the measured terminal resistance Rx and Ry. Therefore, the position sensing and encoding is accomplished by sensing the terminal resistance values and A/D converting them to digital x and y coordinates. In this apparatus, the A/D function is provided by the game port of the personal computer and thus not shown in FIG 3. It should be pointed out that the touch pad apparatus according to this invention is functionally and electrically equivalent to the widely known joystick apparatus. The two discrete switches 10, 11 on one side of the touch sensitive area 7 are equivalent to the two buttons of the joystick while the touch sensitive region and the two variable terminal resistance Rx 8 and Ry 9 are equivalent to the the joystick mechanism and its two potentiometers. Therefore, the touch pad apparatus interface signals are identical to those of the joystick and they are labelled next to the relevant interface connector conductor pads of the touch pad apparatus in the FIG. 3. A1 and A2 are equivalent joystick analog inputs while D1 and D2 are equivalent joystick push button inputs. The +5 is the power supply voltage to the touch pad apparatus from the game port, and G1 and G2 denote the ground signal returns for D1 and D2 respectively. The number inside the parentheses is the bin number of the 9-pin joystick connector. It should be noted that the switches D1 and D2 in the touch pad apparatus are utilized as start, clear, reset and/or next fuctional switch mentioned earlier in the game method discussion.

Unlike most joystick apparatus which has x and y range and centering adjustment mechanism, the present invention is totally passive and stationary except perhaps the touch switches and the adjustment/calibration is done in the software/firmware. The normalization or calibration process eliminates the touched position (i,j) decoding error due to the changes in the x and terminal resistances resulted from the enviromental factors and/or the aging effect after manufacturing. The process consists of sensing the x and y terminal resistance in terms of A/D converted numbers before the game starts and the touch pad is touched, and dividing them with corresponding p and q respectively to obatin Ra and Rb. Using this normalizing values in Eq. (1) and (2), the detected touch cordinates, i and j are calculated as follows:

$$i = \frac{Ry}{Ra} + 1 \quad (3)$$

$$j = \frac{Rx}{Rb} + 1 \quad (4)$$

where p and q are the number of rows and columns of touch positions respectively, and Rxo and Ryo are respectively the measured x and y terminal resistance before the game starts and the touch pad is touched. This normalization process is performed frequently to ensure minimal decoding errors. A variation to the above calibration process requires the player to touch a calibration position which is defined by the intersection of last column q and row p sensing conductor. It is the lower-left corner of the position touch sensing region in FIG. 3. This allows the computer to sense the maximum terminal x and y resistance when touched.

Unlike a digitizing tablet which does not care to distinguish the normally untouched state and touched state, the present game apparatus requires to detect said two states with certainty. To accomplish this, the resistance between the last column sensing conductor q and the common ground return 13 is made much larger than the resistance between any two adjacent column sensing conductors. This can be implemented by narrowing and/or lengthening that portion of the resistive coating such as illustrated by 8'. Similarly, the resistive coating between the last row sensing conductor p and the common ground return 13 is lengthened or narrowed as illustrated by 9'. If these two resistors are r1 and r2 respectively, the normally untouched state terminal resistance Rxo and Ryo are given by $$Rxo = (q-1) * Ra + r1 \quad (5)$$

$$\text{and } Ryo = (p-1) * Rb + r2 \quad (6)$$

The difference between Rxo and Rx or that between Ryo and Ry for any touched position is at least r1 or r2, respectively. Since r1 and r2 are much larger than Ra and Rb, respectively, the normally untouched and any touched state can be easily detected with great certainty. The r1 and r2 is at least 2 to 3 times larger than corresponding Ra and Rb.

Figure 4A:
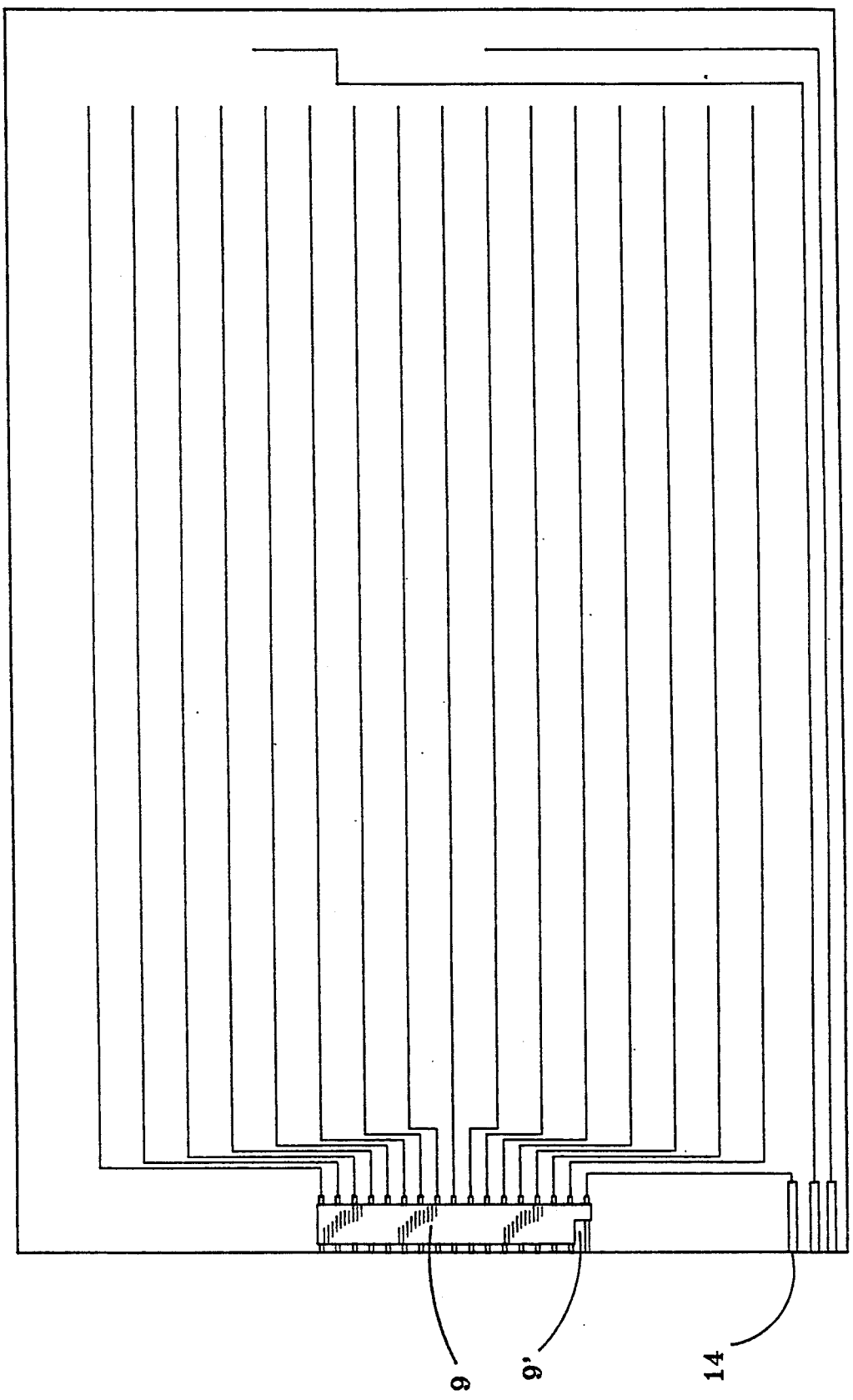
FIG. 4 a–b shows the layers of the touch pad device shown in FIG. 3 according to the invention.
Figure 4B:
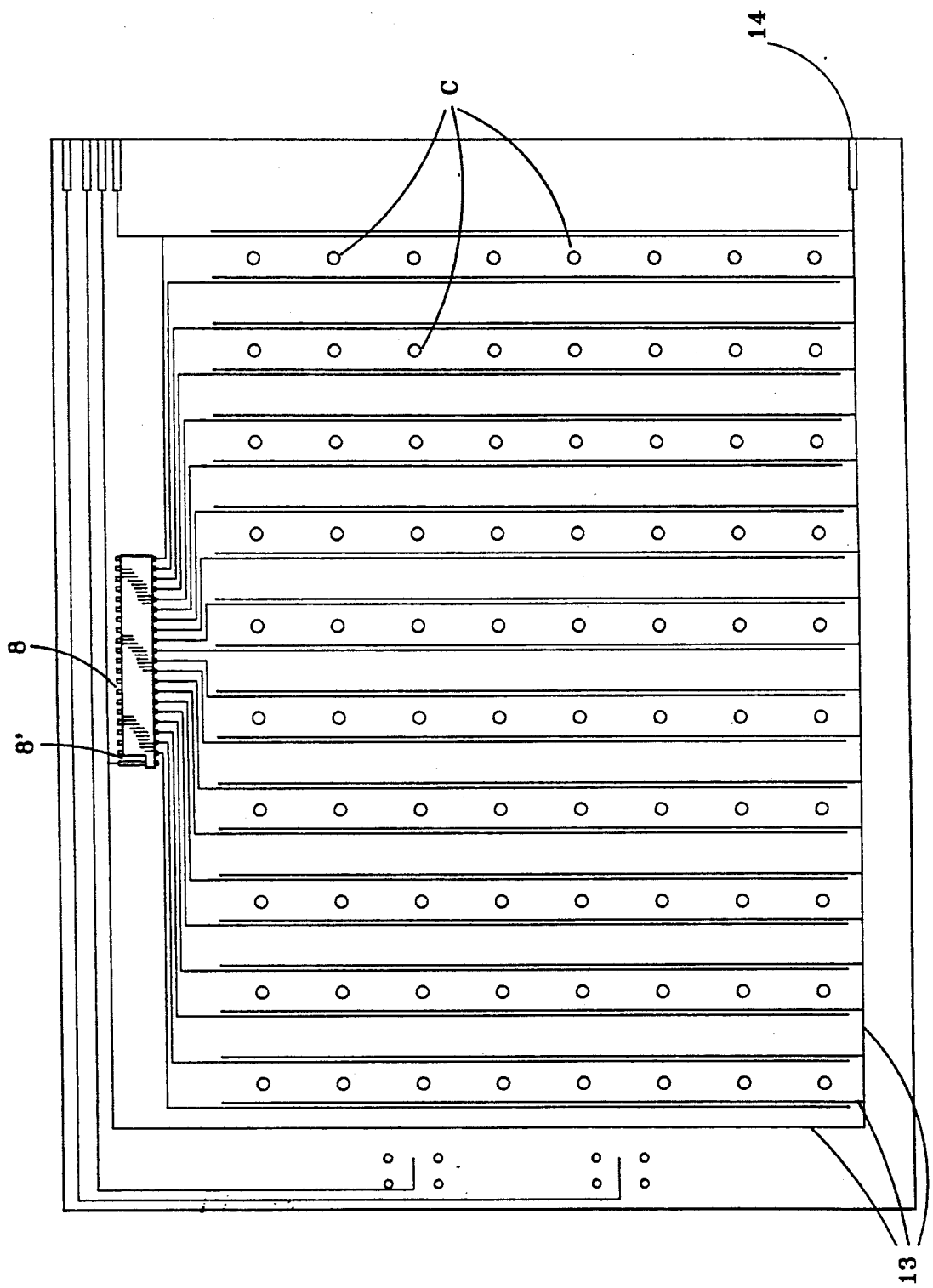

The top, and the bottom layer of the touch pad apparatus shown in FIG. 3 are shown in FIG. 4a, and 4b respectively for clarity. The undersurface of the top or the first membrane layer (FIG. 4a) is coated with p rows of conductors. A resistve strip, Ry 9 is coated across the ends of the row conductors near one side of the membrane layer. The topsurface of the bottom or the second membrane layer (FIG. 4b) is coated with the two sets of q columns of conductors and a conductor bus near the two adjacent sides of the membrane. As pointed out earlier, this conductor bus together with the second set of coloum conductors form a common or a ground return network 13. Again, a resistive ink strip, Rx 8 is coated across the ends of the first set of q column conductors and in contact with one end of the ground return conductor 13. The other end of the ground conductor will be in electrical contact with one end of the Ry 9 resistive ink strip coating of the first layer when these two coated layers are placed on top of one another as indicated in the contact pads 14, of FIG. 4a and 4b. They can also be wired together outside the membrane layers. The resistive ink used in this apparatus can be the E. I. Du PONT 4200 series polymeric thick film coating. The touch sensitive switches in the touch pad apparatus are separated electrically either by a middle membrane layer with a matrix of holes corresponding to the matrix of touch positions where the rows cross the columns or by spacer dots/bumps printed on either layer. In the preferred embodiment, spacer dots/bumps are silk screen printed on either the conductor coating surface of the layer a or layer b. The exact arrangement of these spacer dots/bumps is not critical in the operation of the touch pad apparatus. As shown in FIG. 4b and FIG. 3, the number these spacer dots/bumps is much less than the number of touch positions and they are printed on the clear (uncoated) area of the membrane layer, and thus the bumps can be made of non-insulating material also. No critical alignment is required in the construction of this touch pad since the dots are printed not on, but between the parrallel conductors on the same surface as illustrated by dots C in FIG. 4b and FIG. 3.

Figure 5:
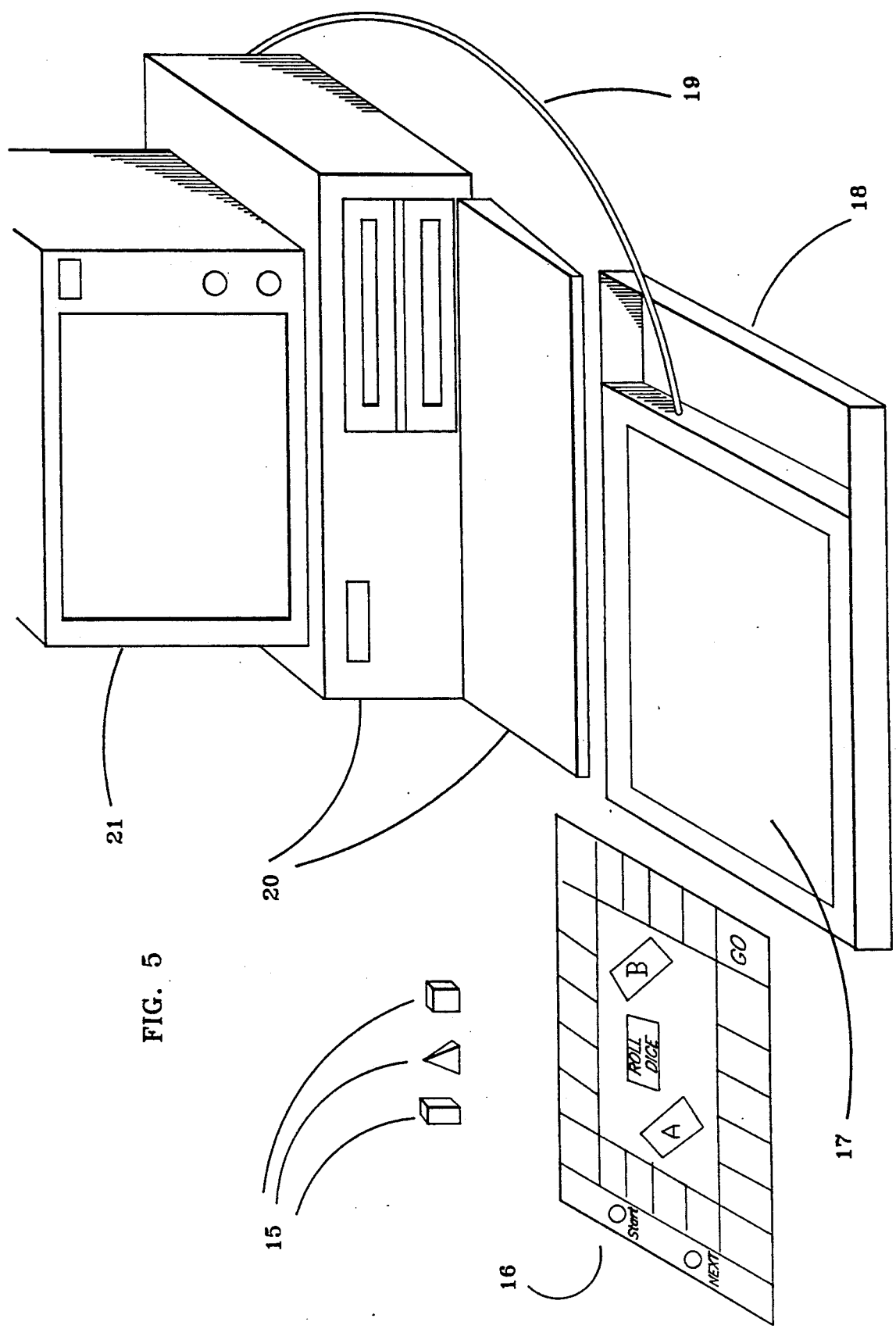
FIG. 5 shows the perspective view of the computerized board game apparatus according to the invention.

Because of the simplicity of the touch pad apparatus, the silk screen printing technique is used in printing all conductor as well as spacer dots/bumps patterns on the two layers. It is clear that the the simple mechanization and manufacturing process according to the present invention makes consumer application of touch pad possible. It should be noted that such a touch pad has no moving part and contains no active electronics. Thus, it is also highly reliable FIG. 5 shows the perspective view of the computerized board game apparatus comprising a plurality of moving game pieces 16, a game board 16, and a low-cost touch pad 17 in a housing 18 with interface cable 19 to the game port of a personal computer system 20 with video monitor 21 and a computer board game program.

The touch pad 17 is the same as or similar to the one described earlier in the educational game apparatus discussion. The player starts the game by running the board game program in the computer system 20. First, the game instruction will be displayed in the video monitor 21. The player is then asked to put the corresponding game board 16 on top of the touch pad 17. The computerized board game is played by making move on the game board 16 with moving game pieces 15. A plurality of functional switches on the game board 16 (some may correspond to the two buttons on the touch pad) are used for signalling to the computer that a move has been or will be made by a player. Player A will use the switch A, and player B will use switch B. Touching these switches does not only signalling to the computer about which player, but also activates other game functions such as the dice rolling function to determine the next move position. The player moves his/her moving game piece 15 to that position and press down on the game board 16 with the moving game piece 15 or with his/her finger. In this manner, the new move position is sensed by the touch pad 17 underneath, and the position cordinates will be decoded by the computer 20. In addition, the computer 20 in this regard acts as a referee or a book-keeper to maintain scores or other game functions. The novelties in this variation of the invention are that the same apparatus can be used for different board games and the computer takes care of all the non-interesting game functions such as the rolling of dice, keeping track of scores, etc. and let the players concentrate on the game strategy. The other advantages are that computer sound and color display can be used to make the board game more fun to play. As it can be seen that by changing to a different game board and running a different game program, players can play many different computerized borad games using the game apparatus of the invention. On the other hand, for some dedicated complex board games, the touch pad 17 may be embedded inside the game board.

Figure 6:
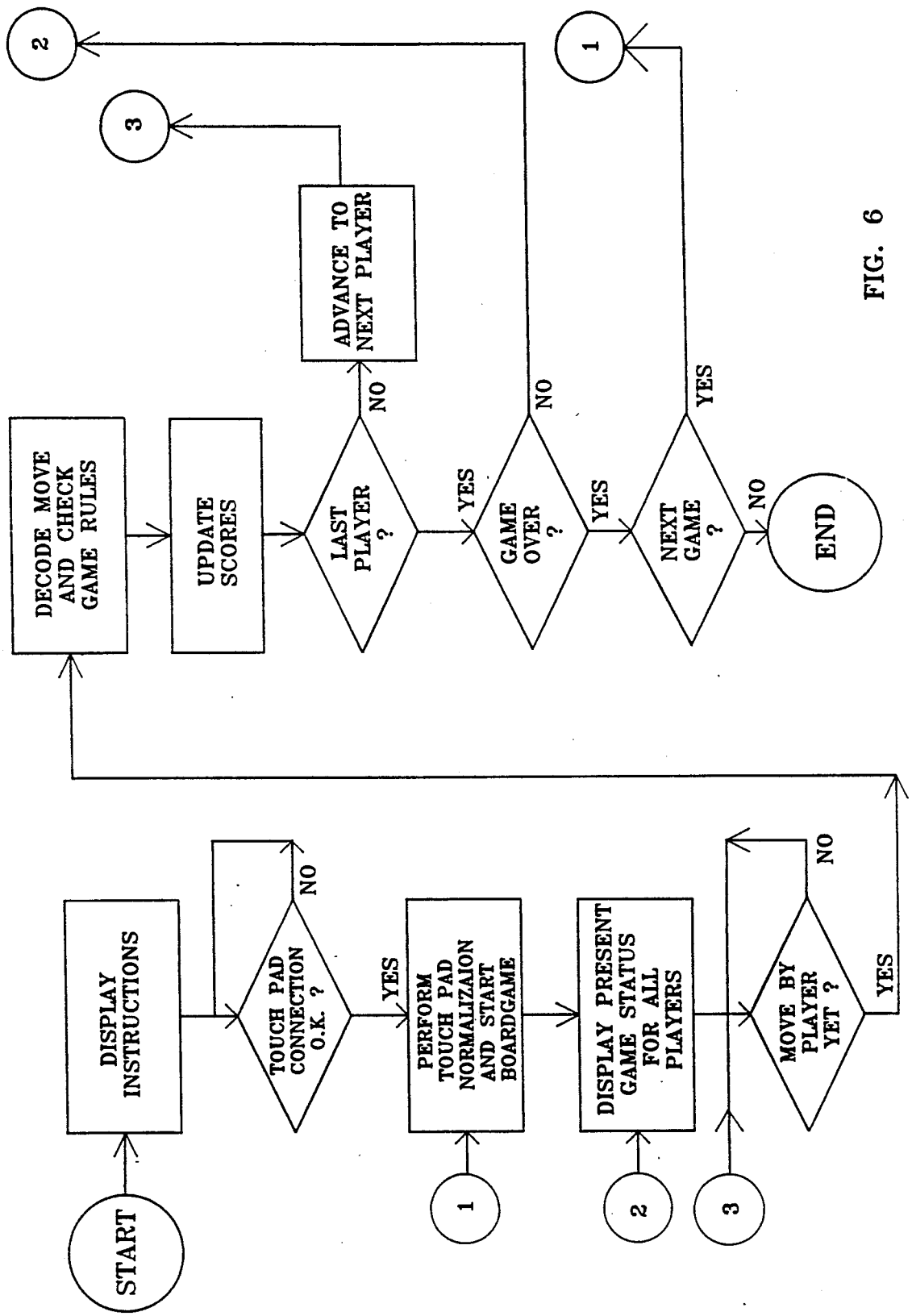
FIG. 6 shows the flow-chart of the computerized board game method according to the invention.

For single player in all computerized board games, the computer displays its move either in text or graphic display and the player puts its moving piece in the said location for the computer's move. For two or more players, the players make their own moves with the moving pieces. In any cases, the computer serves as the referee in addition to other game functions. FIG. 6 shows method of this new class of board games utilizing a touch pad and a personal computer in terms of a flow-chart.

In summary, the present invention is the result of novel combination of a low-cost touch pad, the popular personal/home computer system, the programmable educational game or board game method. Another novelty is that the players can change the game rules as desire to obtain different versions of the same board game in addition to different board games. According the invention, the similar game apparatus can be used for educational games as well as board games. The implementation of this basic concept can take in many forms such as those descripted earlier.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. An educational game apparatus for use by one or more players that incorporates: a plurality of printed sheets; a low-cost touch pad with interface cable to a personal computer system having a game port, said touch pad interfaced directly to said game port;
   where the printed sheet contains a multiplicity of answer regions;
   where said answer sheet lies over the low-cost touch pad;
   where said touch pad comprises
   a. a first sheet of insulating material with one surface coated with a first plurality of parrallel conductive strips which are connected at one end with a resistive coating strip, which has a terminal resistance value in the range compatible with that of a joystick potentiometer;
   b. a second sheet of insulating material with one surface coated with a second plurality of parrallel conductive strips which are connected at one end with a resistive coating strip, which has a terminal resistance value in the range compatible with that of a joystick potentiometer;
   c. A ground return network of a plurality of parallel conductive strips coated on either the conductor coating surface of said first sheet or said second sheet of the insulating material, each strip of said network interleaved with said plurality of conductive strips such that each conductive strip of said ground return network is in closer proximity to an associated sensing conductive strip than the separation distance between any two adjacent sensing conductors;
   d. a spacer pattern of a plurality of dots/bumps coated on either the conductor coating surface of said first sheet or said second sheet of the insulating material, each dot/bump of said pattern printed in-between the printed conductors;
   e. means for orienting said first sheet of insulating material and said second sheet of insulating material such that the conductive strips of the two sheets are facing each other in orthogonal orientation forming a touch position sensing region, and such that by pressing a selected point on the oriented sheets, a selected on or two of said plurality of conductive strips on one sheet come into contact with the interleaved conductive strips of the other sheet, thereby changing the terminal resistance values proportionally to the touched position in the said touch position sensing region;
   f. means for implementing two separate touch switches on the said two insulating sheets outside the said touch position sensing region;
   g. means for interfacing the resistive coating strips and the two said separate touch switches directly to the game port of said personal computer system with the same pin configuration as the commonly known joystick device connector pin allocation;
   h. means for the resistance between the last position sensing conductor and the common ground return much larger than the resistance between any other position sensing conductors by lengthening and/or narrowing the corresponding portion of the resistive coatings;
   and where said personal computer system calibrates the touch pad, displays questions, decodes the touched position, checks for the correctness or incorrectness of the player's selection, and provides video and sound feedback to the player.

2. A computerized board game apparatus for use by one or more players that incorporates: a plurality of moving game pieces, a plurality of game sheets/boards, a low-cost touch pad with interface cable to a personal computer system having a game port, said touch pad interfaced directly to said game port;
   where a game sheet/board lies over the low-cost touch pad;
   where a moving game piece is pressed and placed over the game sheet to indicate a player's current position to other players and to the computer;
   where said touch pad comprises
   a. a first sheet of insulating material with one surface coated with a first plurality of parrallel conductive strips which are connected at one end with a resistive coating strip, which has a terminal resistance value in the range compatible with that of a joystick potentiometer;
   b. a second sheet of insulating material with one surface coated with a second plurality of parrallel conductive strips which are connected at one end with a resistive coating strip, which has a terminal resistance value in the range compatible with that of a joystick potentiometer;
   c. a ground return network of a plurality of parallel conductive strips coated on either the conductor coating surface of said first sheet or said second sheet of the insulating material, each strip of said network interleaved with said plurality of conductive strips such that each conductive strip of said ground return network is in closer proximity to an associated sensing conductive strip than the separation distance between any two adjacent sensing conductors;
   d. a spacer pattern of a plurality of dots/bumps coated on either the conductor coating surface of said first sheet or said second sheet of the insulating material, each dot/bump of said pattern printed in-between the printed conductors;
   e. means for orienting said first sheet of insulating material and said second sheet of insulating material such that the conductive strips of the two sheets are facing each other in orthogonal orientation forming a touch position sensing region, and such that by pressing a selected point on the oriented sheets, a selected one or two of said plurality of conductive strips on one sheet come into contact with the interleaved conductive strips of the other sheet, thereby changing the terminal resistance values proportionally to the touched position in the said touch position sensing region;
   f. means for implementing two separate touch switches on the said two insulating sheets outside the said touch position sensing region;
   g. means for interfacing the resistive coating strips and the two said separate touch switches directly to the game port of said personal computer system with the same pin configuration as the commonly known joystick device connector pin allocation;
   h. means for the resistance between the last position sensing conductor and the common ground return much larger than the resistance between any other position sensing conductors by lengthening and/or narrowing the corresponding portion of the resistive coatings;
   and where said computer system calibrates the touch pad, displays game rules, rolls dice, decodes each player's moved position, keeps score or game status, serves as a referee, and provides video and sound feedback to the players.

* * * * *